United States Patent
Wu et al.

(10) Patent No.: US 12,460,768 B2
(45) Date of Patent: Nov. 4, 2025

(54) FIRST SUPPORT ASSEMBLY, SUPPORT ASSEMBLY SYSTEM, DISPLAY APPARATUS AND DOUBLE-SIDED DISPLAY APPARATUS

(71) Applicant: BOE TECHNOLOGY GROUP CO., LTD., Beijing (CN)

(72) Inventors: Yunpeng Wu, Beijing (CN); Liping Lei, Beijing (CN); Zifeng Wang, Beijing (CN); Yan Ren, Beijing (CN); Lei Cao, Beijing (CN); Wenbin Wang, Beijing (CN); Jinggang Wei, Beijing (CN); Junmin Sun, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 289 days.

(21) Appl. No.: 18/028,795

(22) PCT Filed: Oct. 11, 2021

(86) PCT No.: PCT/CN2021/123066
§ 371 (c)(1),
(2) Date: Mar. 28, 2023

(87) PCT Pub. No.: WO2022/111075
PCT Pub. Date: Jun. 2, 2022

(65) Prior Publication Data
US 2023/0332737 A1    Oct. 19, 2023

(30) Foreign Application Priority Data

Nov. 25, 2020   (CN) .......................... 202011341467.4

(51) Int. Cl.
*F16M 13/00*    (2006.01)
*F16M 11/10*    (2006.01)
(Continued)

(52) U.S. Cl.
CPC .......... *F16M 13/022* (2013.01); *F16M 11/10* (2013.01); *F16M 11/126* (2013.01); *G09F 9/30* (2013.01); *H05K 5/0234* (2013.01)

(58) Field of Classification Search
CPC .... F16M 13/022; F16M 11/10; F16M 11/126; G09F 9/30; H05K 5/0234
See application file for complete search history.

(56) References Cited

FOREIGN PATENT DOCUMENTS

| CN | 201212604 Y | 3/2009 |
|---|---|---|
| CN | 101697262 A | 4/2010 |

(Continued)

OTHER PUBLICATIONS

CN 204176272U; English Translation; published in 2015 (Year: 2015).*

(Continued)

*Primary Examiner* — Pete T Lee
(74) *Attorney, Agent, or Firm* — HOUTTEMAN LAW LLC

(57) ABSTRACT

A first support assembly, a support assembly system, a display apparatus and a double-sided display apparatus, where the first support assembly includes a back plate body and a sliding bracket, and the back plate body is provided with a sliding slot structure; the sliding bracket is mounted to the back plate body and includes a bracket body, a first connecting structure and a second connecting structure, the first connecting structure and the second connecting structure are arranged at the bracket body and spaced apart from each other, the bracket body is at the outer side of the back plate body, and the first connecting structure is configured to be slidable along the sliding slot structure.

19 Claims, 8 Drawing Sheets

(51) Int. Cl.
*F16M 11/12* (2006.01)
*F16M 13/02* (2006.01)
*G09F 9/30* (2006.01)
*H05K 5/02* (2006.01)

(56) References Cited

FOREIGN PATENT DOCUMENTS

| CN | 204176272 U | 2/2015 |
| CN | 206112460 U | 4/2017 |
| CN | 207796471 U | 8/2018 |
| CN | 209782151 U | 12/2019 |
| CN | 210716760 U | 6/2020 |
| CN | 112483828 A | 3/2021 |
| WO | 2017085505 A1 | 5/2017 |

OTHER PUBLICATIONS

China Patent Office, First Office Action issued Jan. 13, 2022 for application No. CN202011341467.4.

\* cited by examiner

FIRST SUPPORT ASSEMBLY, SUPPORT ASSEMBLY SYSTEM, DISPLAY APPARATUS AND DOUBLE-SIDED DISPLAY APPARATUS

CROSS-REFERENCE TO RELATED APPLICATIONS

This is a National Phase Application filed under 35 U.S.C. 371 as a national st: of PCT/CN2021/123066, filed Oct. 11, 2021, claiming priority of the Chinese Patent Application No. 202011341467.4 entitled "first support assembly, support assembly system, display apparatus, and dual-sided display apparatus" filed on Nov. 25, 2020 by BOE Technology Group Co., LTD, the contents of each of which is hereby incorporated by reference in its entirety.

TECHNICAL FIELD

The present application relates to the technical field of display apparatus, in particular to a first support assembly, a support assembly system, a display apparatus and a double-sided display apparatus.

BACKGROUND

In the technical field of display apparatus, display signs are applied more and more widely in different fields. Although the display signs are identical in body, the use requirements on the display signs in different application scenes are a little different, and the application scenes, such as a tabletop nameplate in a conference, a sign for showing an introduction of an exhibit during an exhibition, a display panel for taking a meal order at a cash register, and the like, all need to face users to a great extent, so that elevation angles of the display signs supported on a table are required to be varying. The display signs in different scenes are generally separately designed, and the elevation angle of each display sign relative to the table is unchangeable or switchable among several predetermined angles. This limitation in functionality has resulted in significant limitations in adapting the conventional display signs to new scenes.

SUMMARY

The present application aims at solving at least one of the technical problems found in related art to a certain degree.

To this end, the present application provides a first support assembly for a display apparatus, which allows an inclination angle of the display apparatus to be adjusted in a wide range and allows two display apparatus arranged back-to-back to be used together on both sides.

The present application further provides a support assembly system including the first support assembly as described above.

The present application provides a display apparatus including the first support assembly as described above.

The present application provides a dual-sided display apparatus including two display assemblies and the support assembly system as described above, where the first support assembly and the second support assembly are configured to support the two display assemblies, respectively.

The first support assembly for a display apparatus according to an embodiment of the present application includes a back plate body and a sliding bracket, where the back plate body is a rear plate of the display apparatus or a support plate detachably connected to the display apparatus, and the back plate body is provided with a sliding slot structure; the sliding bracket is mounted to the back plate body and includes a bracket body, a first connecting structure and a second connecting structure, the first connecting structure and the second connecting structure are arranged at the bracket body and spaced apart from each other, the bracket body is at an outer side of the back plate body, and the first connecting structure is configured to be slidable along the sliding slot structure, where the first support assembly is adapted to being used separately, and the back plate body and the sliding bracket are matched to support the display apparatus; or the first support assembly is adapted to being used together with a second support assembly, the first support assembly and the second support assembly are disposed back-to-back, and the second connecting structure in the first support assembly is configured to be detachably connected to the second support assembly.

In the first support assembly for a display apparatus according to the embodiment of the present application, through mounting the sliding bracket to the back plate body and sliding the first connecting structure along the sliding slot structure, when the first support assembly is adapted to being used separately, a relative position between the sliding bracket and the back plate body may be adjusted, and thereby an angle between the back plate body and a holder may be adjusted, since the back plate body is the rear plate of the display apparatus or the support plate detachably connected to the display apparatus, the sliding bracket may slide relative to the back plate body to adjust the angle between the display apparatus and the holder, and thus the requirements of users on different angles for placing the display apparatus may be met; when the first support assembly is adapted to being used together with the second support assembly, the first support assembly and the second support assembly may be disposed back-to-back, which is convenient for users to use the display apparatus at both sides. The second connecting structure of the first support assembly is configured to be detachably connected to the second support assembly, so that the first support assembly and the second support assembly may be conveniently combined together for use, and may be conveniently detached from each other after use, thereby facilitating storage and transportation.

In some embodiments, the sliding bracket is rotatably engaged with the back plate body through the first connecting structure.

In some embodiments, the bracket body is cylindrical, and both the first connecting structure and the second connecting structure are at a circumferential wall of the bracket body and spaced apart from each other in a circumferential direction of the bracket body; where a rotation axis of the sliding bracket intersects a central axis of the bracket body.

In some embodiments, the first support assembly further includes a sliding structure, where the sliding structure is configured to be arrested at an inner side of the back plate body, and is connected to the first connecting structure through a penetrating structure passing through the sliding slot structure.

In some embodiments, a first sliding damping structure is provided between the back plate body and the sliding structure.

In some embodiments, the sliding slot structure includes a plurality of sliding slots.

In some embodiments, at least two of the plurality of sliding slots cross each other.

In some embodiments, the plurality of sliding slots includes a first sliding slot and a second sliding slot parallel to each other, and the first connecting structure is configured to be slidable along the first sliding slot.

In some embodiments, the first support assembly further includes a sliding structure, where the sliding structure is configured to be arrested at an inner side of the back plate body, and includes a first slipping structure, a second slipping structure and a connecting rod structure, the first slipping structure is matched with the first sliding slot to be slidable along the first sliding slot, the second slipping structure is matched with the second sliding slot to be slidable along the second sliding slot, the connecting rod structure connects the first slipping structure and the second slipping structure together, such that the first slipping structure and the second slipping structure are slidable synchronously, and the first connecting structure is connected to the first slipping structure through a penetrating structure passing through the first sliding slot.

In some embodiments, a first sliding damping structure is provided between the back plate body and at least one of the first slipping structure, the second slipping structure and the connecting rod structure.

In some embodiments, a material of the second connecting structure and a material of the second slipping structure are adapted to magnetically attracting each other.

In some embodiments, the second connecting structure is a magnetic connector structure.

In some embodiments, an outer surface of the back plate body is a curved surface protruding toward the outer side of the back plate body.

In some embodiments, the sliding bracket is detachably mounted to the back plate body.

The support assembly system for a display apparatus according to an embodiment of the present application includes the first support assembly as described above, and a second support assembly for being used together with the first support assembly.

In the support assembly system for a display apparatus according to the embodiment of the present application, two display apparatus may be disposed back-to-back, which is convenient for users to use the display apparatus at both sides.

The second connecting structure of the first support assembly is configured to be detachably connected to the second support assembly, so that the first support assembly and the second support assembly may be conveniently combined together for use, and may be conveniently detached from each other after use, thereby facilitating storage and transportation.

In some embodiments, the second support assembly is identical to the first support assembly in structure.

In some embodiments, the first support assembly is the first support assembly as described above, the first support assembly is configured to be used together with the second support assembly, the first support assembly and the second support assembly are disposed back-to-back, the second connecting structure of the first support assembly is connected to the second support assembly and configured to be slidable along the second sliding slot of the second support assembly, and the second connecting structure of the second support assembly is connected to the first support assembly and configured to be slidable along the second sliding slot of the first support assembly.

In some embodiments, the first support assembly is the first support assembly as described above, the first support assembly is configured to be used together with the second support assembly, the sliding bracket of the first support assembly is retained, the sliding bracket of the second support assembly is detached, and the second connecting structure of the first support assembly is connected to the second support assembly and configured to be slidable along the sliding slot structure of the second support assembly; or the sliding bracket of the first support assembly is detached, the sliding bracket of the second support assembly is retained, and the second connecting structure of the second support assembly is connected to the first support assembly and configured to be slidable along the sliding slot structure of the first support assembly.

The display apparatus according to an embodiment of the present application includes a display assembly and the first support assembly as described above, where the back plate body is the rear plate for the display apparatus and at a non-display side of the display assembly.

In the display apparatus according to the embodiment of the present application, through mounting the sliding bracket to the back plate body and sliding the first connecting structure along the sliding slot structure, when the first support assembly is adapted to being used separately, a relative position between the sliding bracket and the back plate body may be adjusted, and thereby an angle between the back plate body and the holder may be adjusted, since the back plate body is the rear plate of the display apparatus or the support plate detachably connected to the display apparatus, the sliding bracket may slide relative to the back plate body to adjust the angle between the display apparatus and the holder, and thus the requirements of users on different angles for placing the display apparatus may be met; when the first support assembly is adapted to being used together with the second support assembly, the first support assembly and the second support assembly may be disposed back-to-back, which is convenient for users to use the display apparatus on both sides. The second connecting structure of the first support assembly is configured to be detachably connected to the second support assembly, so that the first support assembly and the second support assembly may be conveniently combined together for use, and may be conveniently detached from each other after use, thereby facilitating storage and transportation.

The double-sided display apparatus of according to an embodiment of the present application includes two display assemblies and the support assembly system as described above, where the first support assembly and the second support assembly are configured to support the two display assemblies, respectively.

In the double-sided display apparatus according to the embodiment of the present application, through mounting the sliding bracket to the back plate body and sliding the first connecting structure along the sliding slot structure, when the first support assembly is adapted to being used separately, a relative position between the sliding bracket and the back plate body may be adjusted, and thereby an angle between the back plate body and the holder may be adjusted, since the back plate body is the rear plate of the display apparatus or the support plate detachably connected to the display apparatus, the sliding bracket may slide relative to the back plate body to adjust the angle between the display apparatus and the holder, and thus the requirements of users on different angles for placing the display apparatus may be met; when the first support assembly is adapted to being used together with the second support assembly, the first support assembly and the second support assembly may be disposed back-to-back, which is convenient for users to use the display apparatus on both sides. The second connecting structure of the first support assembly is configured to be detachably connected to the second support assembly, so that the first support assembly and the second support assembly may be conveniently combined together for use, and may be conveniently detached from each other after use, thereby facilitating storage and transportation.

Additional aspects and advantages of the present application will be set forth in part in the following description, will become apparent in part from the following description, or may be learned by practice of the present disclosure.

BRIEF DESCRIPTION OF DRAWINGS

The above and/or additional aspects and advantages of the present application will become apparent and readily appreciated from the following description of the embodiment in conjunction with the accompanying drawings, in which.

Figure 1:
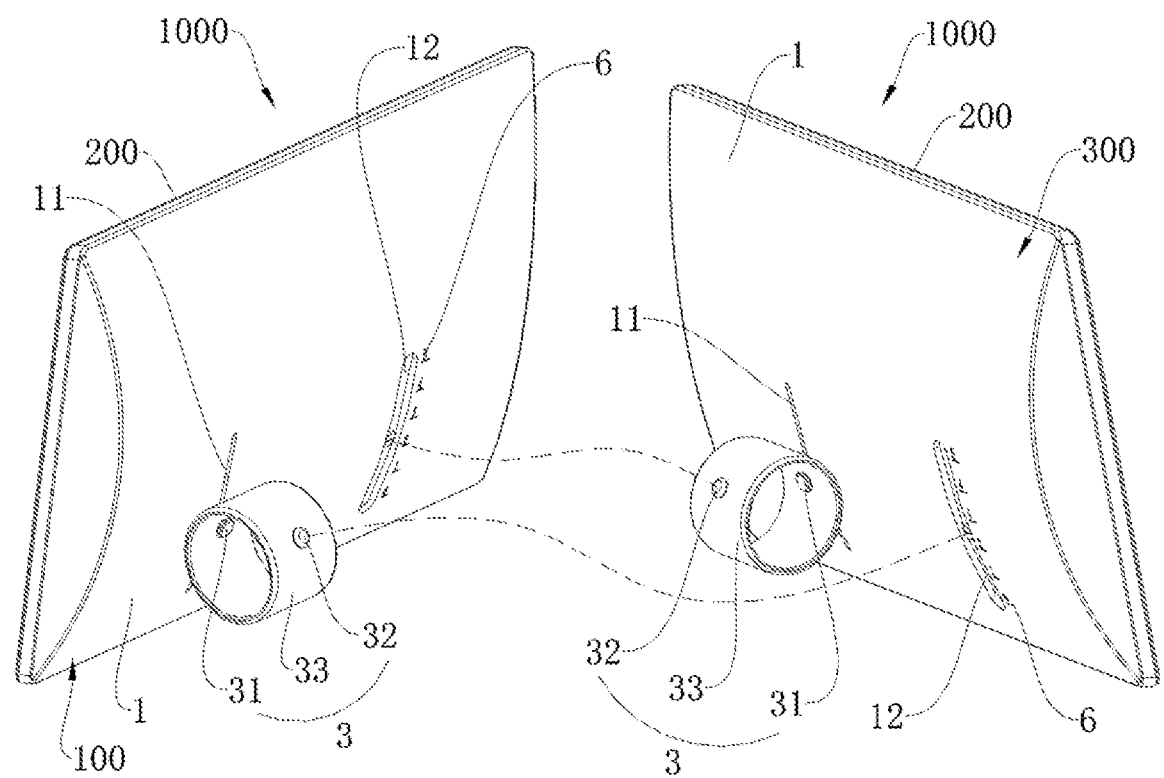
FIG. 1 is a perspective view of two display apparatus according to an embodiment of the present application.

REFERENCE CHARACTERS a display apparatus 1000, a first support assembly 100, a display assembly 200, a second support assembly 300,
a back plate body 1, a sliding slot structure 10, a first sliding slot 11, a second sliding slot 12, a penetrating structure 13,
a sliding structure 2, a first slipping structure 21, a second slipping structure 22, a connecting rod structure 23,
a sliding bracket 3, a first connecting structure 31, a second connecting structure 32, a bracket body 33, a through hole 331, a rotating shaft 332,
a first sliding damping structure 4, a second sliding damping structure 5, a scale mark structure 6.

DETAIL DESCRIPTION OF EMBODIMENTS

Embodiments of the present application will be described in detail below, and examples of the embodiments are illustrated in the accompanying drawings, where same or similar reference numbers refer to the same or similar elements or elements having the same or similar functions throughout the description. The embodiments described below with reference to the accompanying drawings are exemplary only for explaining the present application and are not to be construed as limiting the present application.

A first support assembly 100 and a support assembly system for a display apparatus 1000, a display apparatus 1000, and a dual-sided display apparatus according to the embodiments of the present application will be described below with reference to the accompanying drawings. Here, it should be noted that the type of the display apparatus 1000 according to the present application is not limited. For example, the display apparatus 1000 may be a tabletop nameplate used in a conference, a sign for showing an introduction of an exhibit during an exhibition, a display panel for taking a meal order used in a scene such as a cash register, or the like. Alternatively, the display apparatus 1000 may be, for example, a paper sign, an EPD display sign, an LCD electronic sign, or the like. In many scenes, the display apparatus 1000 is required to face the user at different angles. The first support assembly 100 and the support assembly system of the present application may enable an angle of the display apparatus 1000 to be freely adjusted in a wide range, to meet requirements of the different application scenes.

As shown in FIGS. 1 to 10, the first support assembly 100 for a display apparatus 1000 according to an embodiment of the present application includes a back plate body 1 and a sliding bracket 3.

Figure 10:
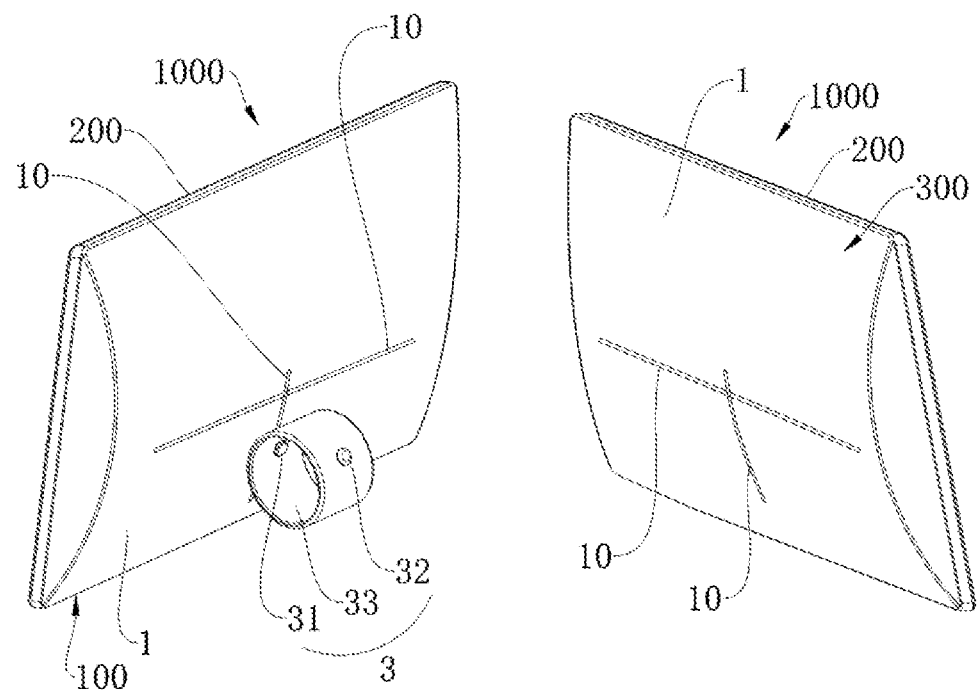
FIG. 10 is a perspective view of two display apparatus according to another embodiment of the present application.

Specifically, referring to FIGS. 1 and 10, the back plate body 1 is a rear plate of the display apparatus 1000 or a support plate detachably connected to the display apparatus 1000, and the back plate body 1 has a sliding slot structure 10 thereon. The sliding bracket 3 is mounted on the back plate body 1 and includes a bracket body 33, a first connecting structure 31 and a second connecting structure 32. The first connecting structure 31 and the second connecting structure 32 are spaced apart from each other on the bracket body 33. The bracket body 33 is located at an outer side of the back plate body 1. The first connecting structure 31 is configured to be slidable along the sliding slot structure 10. When the first support assembly 100 is adapted to being used separately, the back plate body 1 and the sliding bracket 3 cooperate to support the display apparatus 1000. Alternatively, when the first support assembly 100 is adapted to being used together with the a second support assembly 300, the first support assembly 100 and the second support assembly 300 are disposed back-to-back, and the second connecting structure 32 of the first support assembly 100 is configured to be detachably connected to the second support assembly 300.

It should be noted that "the outer side of the back plate body 1" refers to a side of the back plate body 1 away from a display side of the display apparatus 1000 in a thickness direction of the display apparatus 1000. In addition, the term "the first support assembly 100 and the second support assembly 300 are disposed back-to-back" means that an outer surface of the back plate body 1 of the first support assembly 100 faces to an outer surface of the back plate body 1 of the second support assembly 300.

In addition, it should be noted that "the rear plate of the display apparatus 1000" refers to an own back plate of the display apparatus 1000 on the back side of the display apparatus 1000, which back plate is not detachable from the display apparatus 1000. "The support plate detachably connected to the display apparatus 1000" refers to a back plate detachably mounted to the back side of the display apparatus 1000, such as a protective sleeve clamped or sleeved on the back side of the display apparatus 1000.

Figure 3:
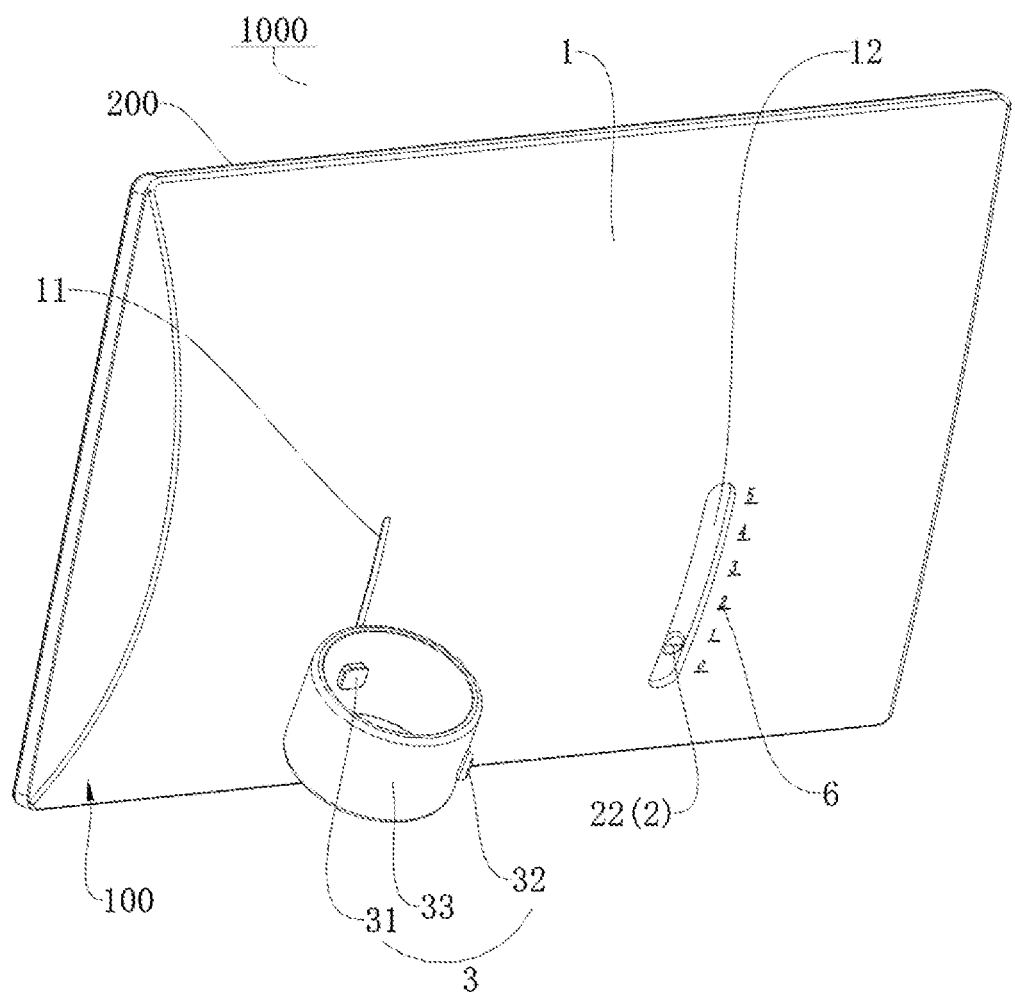
FIG. 3 is a perspective view of a display apparatus according to an embodiment of the present application.

It may be understood that referring to FIG. 3, the sliding bracket 3 may be mounted to the back plate body 1 through the first connecting structure 31, and the sliding bracket 3 may support the back plate body 1, so that when the back plate body 1 is placed on the holder, a certain angle may be formed between the back plate body 1 and the holder. Here, the holder may be a conference table, a dining table, a cash register, a floor, etc., and the holder has a same meaning throughout this description. The first connecting structure 31 may slide along the sliding slot structure 10 to adjust a relative position between the sliding bracket 3 and the back plate body 1, and thus the angle between the back plate body 1 and the holder may be adjusted. Since the back plate body 1 is the rear plate of the display apparatus 1000 or the support plate detachably connected to the display apparatus 1000, the sliding bracket 3 may slide relative to the back plate body 1 to adjust the angle between the display apparatus 1000 and the holder, and thus the requirements of users on different angles for placing the display apparatus 1000 may be met. The bracket body 33 is located at the outer side of the back plate body 1, which is convenient for the user to adjust the relative position between the sliding bracket 3 and the back plate body 1.

Figure 4:
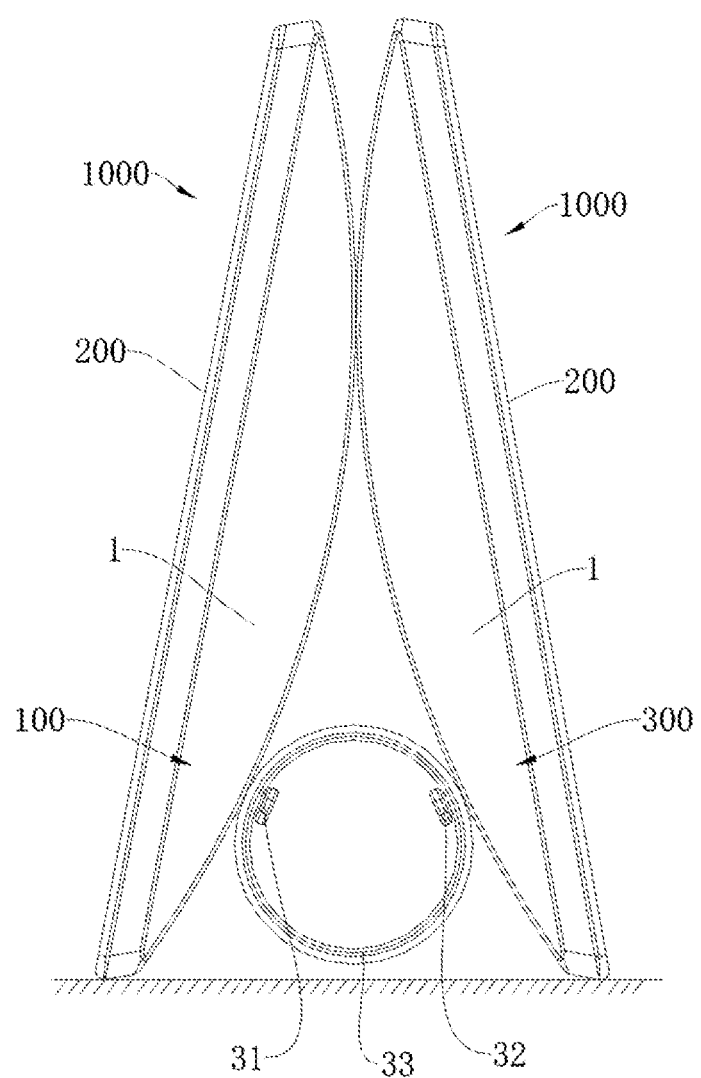
FIG. 4 is a schematic diagram of a state where two display apparatus are disposed back-to-back according to an embodiment of the present application.
Figure 5:
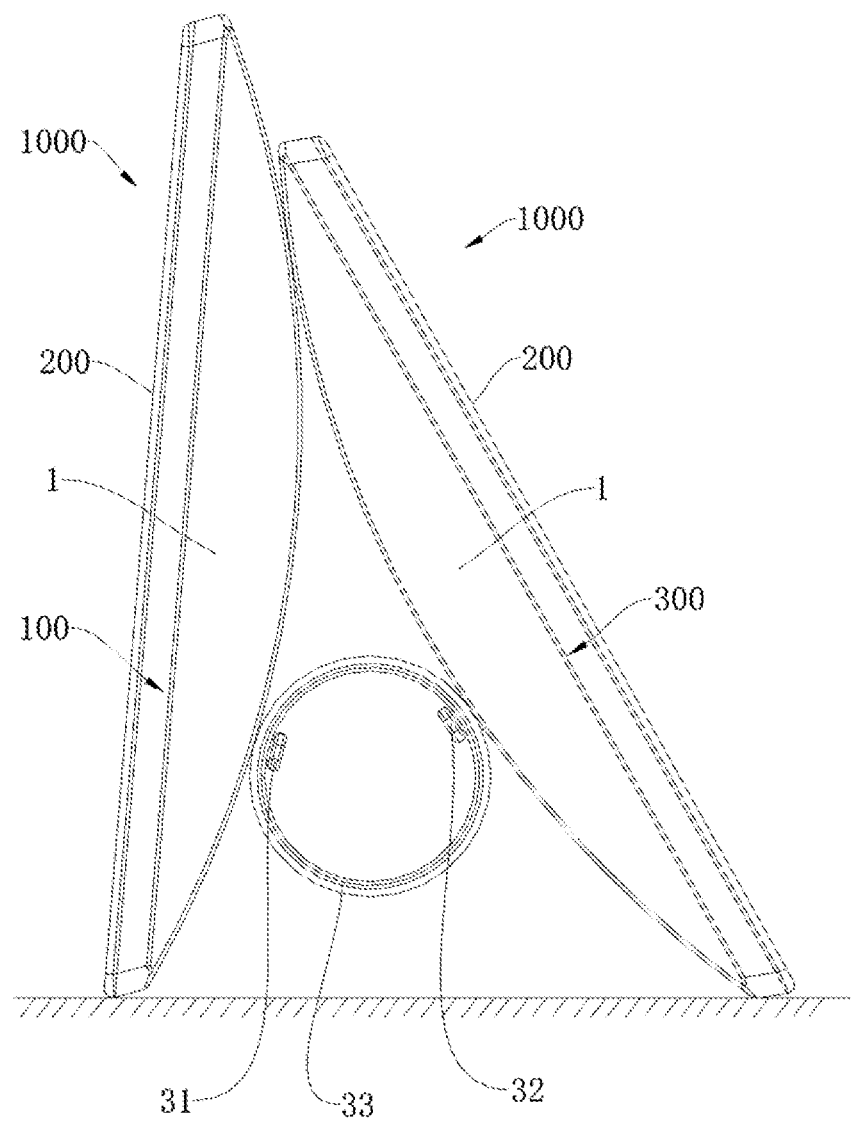
FIG. 5 is a schematic diagram of another state where two display apparatus are disposed back-to-back according to an embodiment of the present application.

In addition, in some cases, a double-sided display is required. Referring to FIGS. 4 to 5, for example, when a cashier checks out, one side of the display apparatus is required to display for the cashier, and the other side of the display apparatus is required to display for a payer, which is only taken as an example. There are, of course, other double-sided application scenes. In this case, the first support assembly 100 is adapted to being used together with the second support assembly 300, the first support assembly 100 and the second support assembly 300 are disposed back-to-back, and the second connecting structure 32 of the first support assembly 100 is configured to be detachably connected to the second support assembly 300. Here, the second support assembly 300 may be another support assembly with the same structure as the first support assembly 100. Alternatively, the second support assembly 300 may be another support assembly with a different structure from the first support assembly 100, for example, the second support assembly 300 may not include the sliding bracket 3, or the second support assembly 300 may not include the sliding slot structure 10, or the second support assembly 300 may not include the sliding bracket 3 and the sliding slot structure 10. The second support assembly 300 may be a rear plate of the display apparatus 1000 or a support plate detachably connected to the display apparatus 1000. Therefore, the two display apparatus 1000 may be disposed back-to-back, which is convenient for users to use the display apparatus 1000 on both sides. The second connecting structure 32 of the first support assembly 100 is configured to be detachably connected to the second support assembly 300, so that the first support assembly 100 and the second support assembly 300 may be conveniently combined together for use, and may be conveniently detached from each other after use, thereby facilitating storage and transportation.

In the related art, the display signs are applied more and more widely in different fields. Although the display signs are identical in body, the use requirements on the display signs in different application scenes are a little different, and the application scenes such as a tabletop nameplate in a conference, a sign for showing an introduction of an exhibit during an exhibition, a display panel for taking a meal order at a cash register, and the like, all need to face users to a great extent, so that elevation angles of the display signs supported on a table are required to be varying. The display signs in different scenes are generally separately designed, and the elevation angle of each display sign relative to the table is unchangeable or switchable among several predetermined angles. This limitation in functionality has resulted in significant limitations in adapting the conventional display signs to new scenes.

In the first support assembly 100 for a display apparatus 1000 according to the embodiment of the present application, through mounting the sliding bracket 3 to the back plate body 1 and sliding the first connecting structure 31 along the sliding slot structure 10, when the first support assembly 100 is adapted to being used separately, a relative position between the sliding bracket 3 and the back plate body 1 may be adjusted, and thereby the angle between the back plate body 1 and the holder may be adjusted. Since the back plate body 1 is the rear plate of the display apparatus 1000 or the support plate detachably connected to the display apparatus 1000, the sliding bracket 3 may slide relative to the back plate body 1 to adjust the angle between the display apparatus 1000 and the holder, and thus the requirements of users on different angles for placing the display apparatus 1000 may be met; when the first support assembly 100 is adapted to being used together with the second support assembly 300, the first support assembly 100 and the second support assembly 300 may be disposed back-to-back, which is convenient for users to use the display apparatus 1000 on both sides. The second connecting structure 32 of the first support assembly 100 is configured to be detachably connected to the second support assembly 300, so that the first support assembly 100 and the second support assembly 300 may be conveniently combined together for use, and may be conveniently detached from each other after use, thereby facilitating storage and transportation.

In some embodiments of the present application, as shown in FIGS. 1 and 3, the sliding bracket 3 is rotatably engaged with the back plate body 1 through the first connecting structure 31. It should be noted that in this embodiment, a rotation axis of the sliding bracket 3 relative to the back plate body 1 may be set as required, for example, the rotation axis may be parallel to the display surface of the display apparatus 100, or may be perpendicular to the display surface of the display apparatus 100, or the like. Therefore, the use of the sliding bracket 3 may be more flexible, and different support effects for the back plate body 1 may be realized through rotating the sliding bracket 3 to different positions.

According to some embodiments of the present application, referring to FIGS. 1 and 3, the bracket body 33 may be cylindrical, and the first connecting structure 31 and the second connecting structure 32 are arranged at a circumferential wall of the bracket body 33 and spaced apart in a circumferential direction of the bracket body 33. The rotation axis of the sliding bracket 3 intersects a central axis of the bracket body 33. The cylindrical bracket body 33 allows the first connecting structure 31 and the second connecting structure 32 to be oriented in different directions, so that the first connecting structure 31 and the second connecting structure 32 may be connected to the first support assembly 100 and the second support assembly 300, respectively. Therefore, two different display apparatus 1000 may be connected together back-to-back, to realize the double-sided display. Moreover, the cylindrical bracket body 33 allows the first connecting structure 31 to be closer to the back plate body 1 connected to the first connecting structure 31, and allows the second connecting structure 32 to be closer to the second support assembly 300 connected to the second connecting structure 32, and the first connecting structure 31 and the second connecting structure 32 are arranged at the circumferential wall of the bracket body 33 and spaced apart from each other, which is convenient for the second connecting structure 32 to be connected to the second support assembly 300 while the first connecting structure 31 is connected to the back plate body 1 of the first support assembly 100. Alternatively, in other embodiments, the bracket body 33 may have other shapes, such as a sphere, a polygon, etc., which is not limited here.

In some specific examples, the rotation axis of the sliding bracket 3 intersects the central axis of the bracket body 33. Therefore, the use of the sliding bracket 3 may be more flexible, the back plate body 1 may be supported by the sliding bracket 3 at different positions. When the display apparatus 1000 is required to display on a single side, as shown in FIG. 3, the central axis of the bracket body 33 forms an angle with respect to the display surface of the display apparatus 1000, namely, forms an angle with respect to the holder, so that the support for the bracket body 33 is more stable. When the display apparatus 1000 is required to display on both sides, as shown in FIG. 1, the sliding bracket 3 is rotated around the rotation axis until the central axis of the bracket body 33 is parallel to the display surface of the display apparatus 1000, that is, parallel to the holder, thereby the cylindrical bracket body 33 allows the first connecting structure 31 and the second connecting structure 32 to be oriented in different directions, so that the first connecting structure 31 and the second connecting structure 32 may be connected to the first support assembly 100 and the second support assembly 300, respectively, thereby connecting two different display apparatus 1000 together to realize the double-sided display. Further, the cylindrical bracket body 33 allows the first connecting structure 31 to be closer to the first support assembly 100 connected to the first connecting structure 31, and allows the second connecting structure 32 to be closer to the second support assembly 300 connected to the second connecting structure 32, so that the first connecting structure 31 and the second connecting structure 32 are arranged at the circumferential wall of the bracket body 33 and spaced apart from each other, which is convenient for the second connecting structure 32 to be connected to the second support assembly 300 while the first connecting structure 31 is connected to the back plate body 1 of the first support assembly 100.

Figure 2:
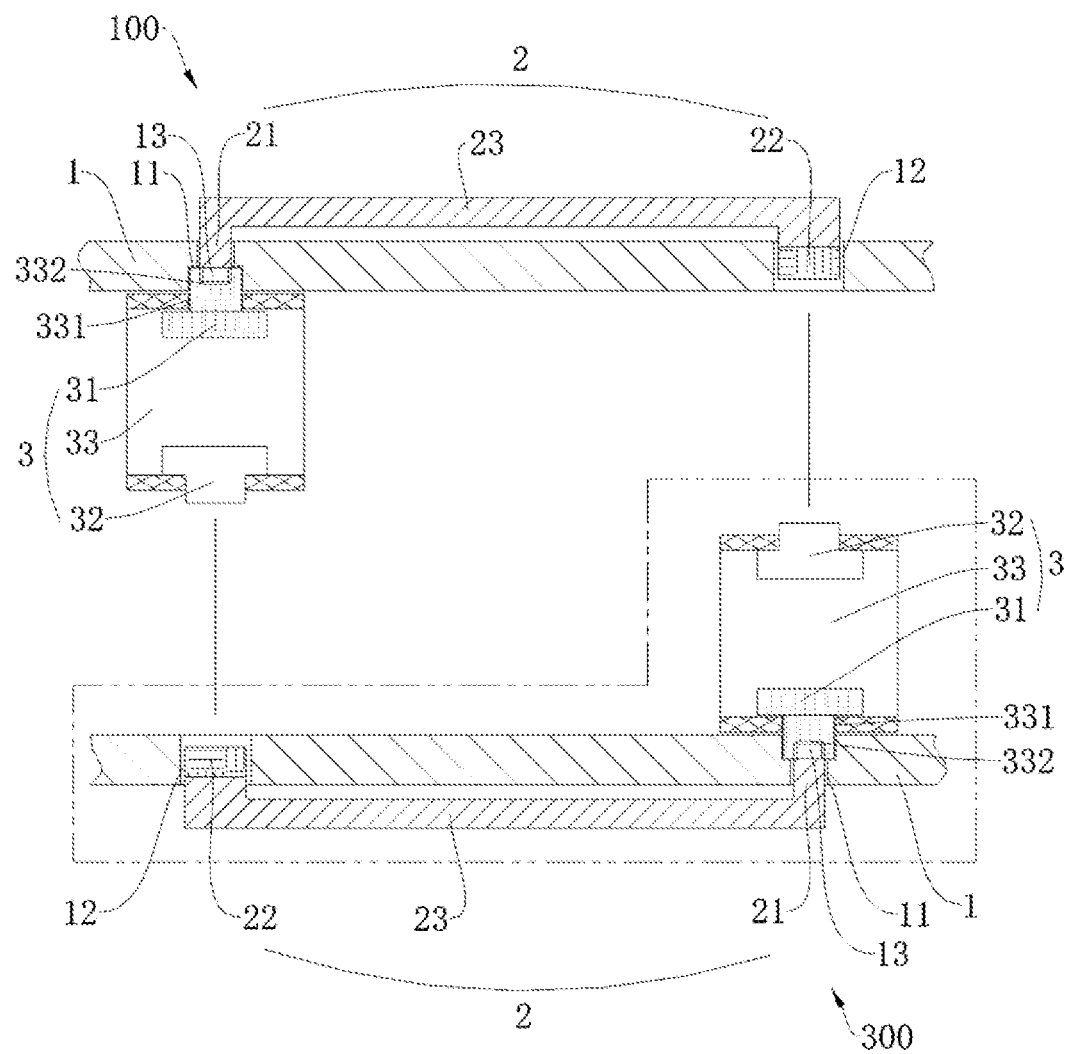
FIG. 2 is a cross-sectional view of two display apparatus to be mounted together back-to-back according to an embodiment of the present application.

Referring to FIG. 2, according to some embodiments of the present disclosure, the first support assembly 100 further includes a sliding structure 2, the sliding structure 2 is configured to be arrested at an inner side of the back plate body 1, and is connected to the first connecting structure 31 through a penetrating structure 13 passing through the sliding slot structure 10. The penetrating structure 13 may be a part of the first connecting structure 31, or a part of the sliding structure 2, or a part independent from the first connecting structure 31 and the sliding structure 2 and connecting the first connecting structure 31 and the sliding structure 2 together, so that the sliding structure 2 and the first connecting structure 31 may be connected together through the penetrating structure 13. The sliding structure 2 may facilitate the first connecting structure 31 to slide in the sliding slot structure 10, and further facilitate changing a relative position between the sliding bracket 3 and the back plate body 1, thereby an angle between the back plate body 11 and the holder may be adjusted.

Figure 8:
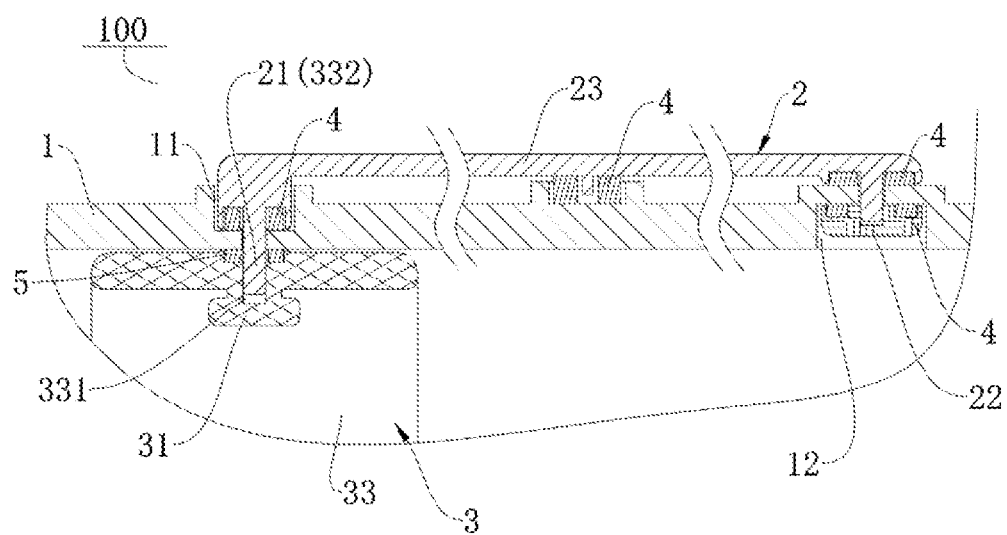
FIG. 8 is a cross-sectional view of a part of a first support assembly according to an embodiment of the present application.
Figure 9:
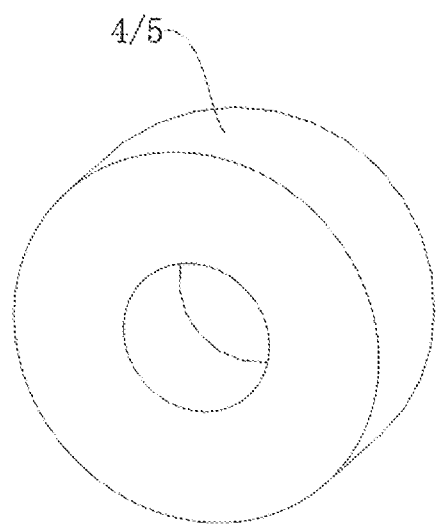
FIG. 9 is a perspective view of a first sliding damping structure or a second sliding damping structure according to an embodiment of the present application.

As shown in FIGS. 8 to 9, in some embodiments of the present application, a first sliding damping structure 4 may be disposed between the back plate body 1 and the sliding structure 2, thereby a damping force may be added between the back plate body 1 and the sliding structure 2, so that the sliding structure 2 may stay at any position of the sliding slot structure 10, and may not slide to the bottom of the sliding slot structure 10 due to the gravity of the sliding structure 2. Further, the sliding bracket 3 connected to the sliding structure 2 may be located at different positions of the back plate body 1, thereby facilitating realizing the stability of the display apparatus 1000 placed at different angles, including not only a single display apparatus 1000 placed at different angles, but also each of two display apparatus 1000 back-to-back placed at different angles.

According to some embodiments of the present application, the sliding slot structure 10 may include a plurality of sliding slots, for example, in an example shown in FIG. 1, the sliding slot structure 10 may include two sliding slots, which may be arranged in parallel. When the second support assembly 300 and the first support assembly 100 have a same structure, and the first support assembly 100 and the second support assembly 300 are disposed back-to-back, the sliding bracket 3 of the first support assembly 100 and the sliding bracket 3 of the second support assembly 300 may be arranged in the two sliding slots, respectively. Therefore, the two sliding brackets 3 may slide in the two sliding slots, respectively, and the two sliding brackets 3 may be at different positions relative to the respective back plate bodies 1, thereby the angles between display apparatus 1000 and the holder may be adjusted, respectively, and it may be realized that the angles of the two display apparatus 1000 are freely and independently adjusted in a wide range. FIG. 4 shows an example in which the two display apparatus 1000 are placed at the same angle, and FIG. 5 shows an example in which the two display apparatus 1000 are placed at different angles. Meanwhile, the two sliding brackets 3 allow the support for each back plate body 1 to be more stable.

For example, in the example shown in FIG. 10, each sliding slot structure 10 may include two sliding slots, and the two sliding slots are arranged to have an included angle therebetween, so that the sliding bracket 3 may slide in each sliding slot. That is, the sliding bracket 3 may slide in one of the two sliding slots back and forth, the sliding bracket 3 may also slide in the other of the two sliding slots back and forth, and the sliding bracket 3 may also slide from one of the two sliding slots to the other of the two sliding slot. Therefore, the sliding bracket 3 may be located at any position of the two sliding slots, so that the display apparatus 1000 may be supported horizontally and vertically, thereby improving the flexibility of the use of the display apparatus 1000. Alternatively, the sliding slot structure 10 may include three sliding slots, four sliding slots, five sliding slots, or the like, which will not be described one by one in detail herein.

As shown in FIG. 10, in some embodiments of the present application, at least two of the plurality of sliding slots cross each other. Therefore, the sliding bracket 3 may be facilitated to slide from one of the two sliding slots to the other of the two sliding slots crossing each other. Therefore, the sliding bracket 3 may be located at any position of the two sliding slots described above, so that the display apparatus 1000 may be supported horizontally and vertically, thereby improving the flexibility of the use of the display apparatus 1000.

According to some embodiments of the present application, referring to FIGS. 1 to 2, the plurality of sliding slots includes a first sliding slot 11 and a second sliding slot 12 arranged in parallel, and the first connecting structure 31 is configured to be slidable along the first sliding slot 11. It may be understood that, when the second support assembly 300 and the first support assembly 100 have a same structure, and the first support assembly 100 and the second support assembly 300 are disposed back-to-back, the sliding bracket 3 on the first support assembly 100 and the sliding bracket 3 on the second support assembly 300 may be disposed in the first sliding slot 11 and the second sliding slot 12, respectively. Therefore, the two sliding brackets 3 may slide in the first sliding slot 11 and the second sliding slot 12, respectively, and the two sliding brackets 3 may be at different positions relative to the respective back plate bodies 1, thereby the angles between display apparatus 1000 and the holder may be adjusted, respectively, and it may be realized that the angles of the two display apparatus 1000 are freely and independently adjusted in a wide range. FIG. 4 shows an example in which the two display apparatus 1000 are placed at the same angle, and FIG. 5 shows an example in which the two display apparatus 1000 are placed at different angles. Meanwhile, the two sliding brackets 3 allow the support for each back plate body 1 to be more stable.

As shown in FIG. 2, in some embodiments of the present application, the first support assembly 100 may further include a sliding structure 2, the sliding structure 2 is arrested at the inner side of the back plate body 1, and includes a first slipping structure 21, a second slipping structure 22 and a connecting rod structure 23. "The inner side of the back plate body 1" refers to a side of the back plate body 1 close to the display side of the display apparatus 1000 in the thickness direction of the display apparatus 1000. The first slipping structure 21 is fitted to the first sliding slot 11 to slide along the first sliding slot 11, the second slipping structure 22 is fitted to the second sliding slot 12 to slide along the second sliding slot 12, the connecting rod structure 23 connects the first slipping structure 21 and the second slipping structure 22 together, so that the first slipping structure 21 and the second slipping structure 22 slide synchronously. The first connecting structure 31 is connected to the first slipping structure 21 through the penetrating structure 13 passing through the first sliding slot 11.

When the first support assembly 100 and the second support assembly 300 have a same structure, and are disposed back-to-back, with the arrangement described above, the first slipping structure 21 and the second slipping structure 22 may slide synchronously, thereby the first connecting structure 31 on one of the sliding brackets 3 and the second connecting structure 32 on the other of the sliding brackets 3 may slide synchronously, thereby the two sliding brackets 3 respectively arranged on the two back plate bodies 1 may slide synchronously, and the two sliding brackets 3 may be at different positions relative to the respective back plate bodies 1, thereby the angles between display apparatus 1000 and the holder may be adjusted, respectively, and it may be realized that the angles of the two display apparatus 1000 are freely and independently adjusted in a wide range. FIG. 4 shows an example in which the two display apparatus 1000 are placed at the same angle, and FIG. 5 shows an example in which the two display apparatus 1000 are placed at different angles. The first support assembly 100 for a display apparatus 1000 according to the present application may allow two display apparatus 100 to be placed at a same angle and at different angles.

The sliding structure 2 is arranged at the inner side of the back plate body 1, and the sliding bracket 3 is arranged at the outer side of the back plate body 1. In this way, the sliding structure 2 and the sliding bracket 3 may be arranged so that an interference between the sliding structure 2 and the sliding bracket 3 may be avoided, and the structure of the first support assembly 100 as a whole is compact, and thus, a volume of the structure of the first support assembly 100 is reduced.

As shown in FIGS. 8 to 9, in some embodiments of the present application, a first sliding damping structure 4 may be disposed between the back plate body 1 and at least one of the first slipping structure 21, the second slipping structure 22 and the connecting rod structure 23, thereby a damping force may be added between the back plate body 1 and at least one of the first slipping structure 21, the second slipping structure 22 and the connecting rod structure 23, so that the sliding structure 2 may stay at any position of the first sliding slot 11 and the second sliding slot 12 of the back plate body 1, and may not slide to the bottom of the first sliding slot 11 and the second sliding slot 12 due to the gravity of the sliding structure 2, thereby the sliding bracket 3 connected to the sliding structure 2 may be facilitated to be located at different positions of the back plate body 1, thereby facilitating realizing the stability of the display apparatus 1000 placed at different angles, including not only a single display apparatus 1000 placed at different angles, but also each of two display apparatus 1000 back-to-back placed at different angles.

Figure 6:
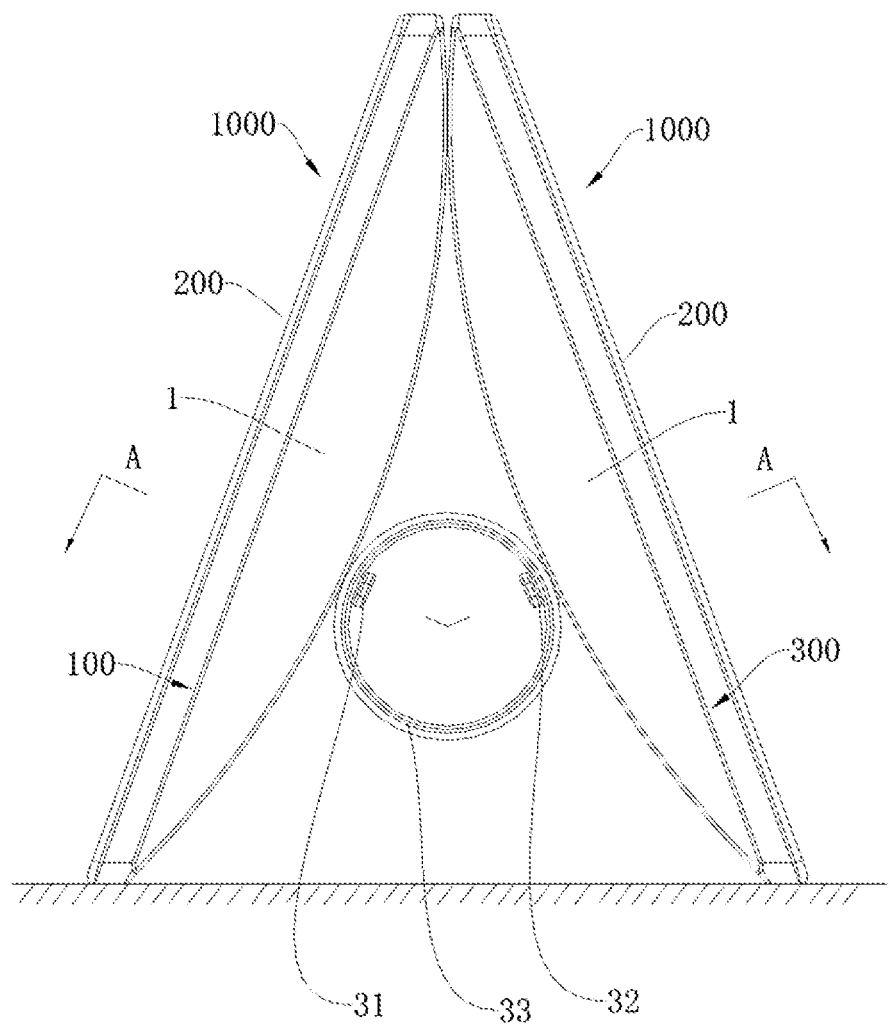
FIG. 6 is a schematic diagram of yet another state where two display apparatus are disposed back-to-back according to an embodiment of the present application.
Figure 7:
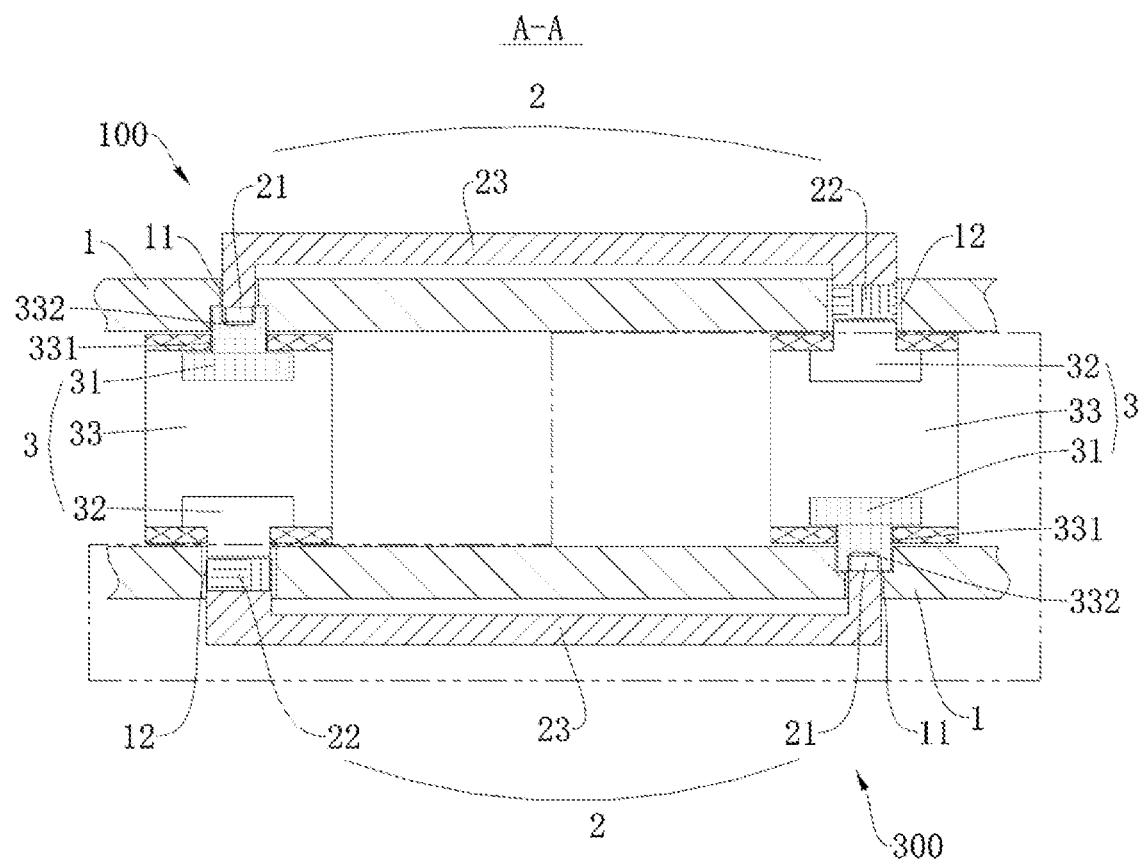
FIG. 7 is a cross-sectional view taken along a line A-A in FIG. 6.

In some embodiments of the present application, as shown in FIGS. 6 to 7, a material of the second connecting structure 32 and a material of the second slipping structure 22 may attract each other through a magnetic force. Therefore, the second connecting structure 32 and the second slipping structure 22 may be magnetically connected together, and the first support assembly 100 and the second support assembly 300 having the same structure may be connected together back-to-back. In addition, the magnetic connection may facilitate the connection between the second slipping structure 22 and the second connecting structure 32, thereby improving an operation convenience, and facilitating a separation of the second slipping structure 22 and the second connecting structure 32 from each other.

It should be noted that, in order to realize that the second slipping structure 22 and the second connecting structure 32 are magnetically connected, both the second slipping structure 22 and the second connecting structure 32 may be provided as a magnet. Alternatively, one of the second slipping structure 22 and the second connecting structure 32 may be provided as a magnet, and the other one is provided as iron, etc., which is not limited herein. In addition, in the embodiments of the present application, besides the above implementation, the fit manner of the second slipping structure 22 and the second connecting structure 32 is not limited to the magnetic connection, for example, may alternatively be a thread fit, a snap fit, etc., or may alternatively be a combination of a strong fit and a weak fit, such as the thread fit plus the magnetic connection.

In some embodiments of the present application, as shown in FIGS. 6 to 7, the second connecting structure 32 is a magnetic connector structure, which may be iron or a magnet, or include magnetic powder, etc., to facilitate magnetic connection of the second slipping structure 22 and the second connecting structure 32.

According to some embodiments of the present application, referring to FIG. 6, the outer surface of the back plate body 1 is a curved surface protruding outward, thereby facilitating the first support assembly 100 and the second support assembly 300 to abut against and use the force from each other when two display apparatus 1000 is required for the two-sided display, and thereby facilitating the first support assembly 100 and the second support assembly 300 to support each other. Further, the first connecting structure 31 of the sliding bracket 3 may slide along a bending direction of the outer surface of the back plate body 1 when sliding along the sliding slot structure 10, so that the inclination angle of the display apparatus 1000 may be better adjusted.

According to some embodiments of the present application, the sliding bracket 3 is detachably mounted to the back plate body 1, so that the sliding bracket 3 may be mounted to the back plate body 1 when the back plate body 1 is required to be placed at an angle relative to the holder, and the sliding bracket 3 may be detached from the back plate body 1 when the back plate body 1 is not required to be placed at an angle relative to the holder, thereby facilitating independent use or storage of the back plate body 1. The sliding bracket 3 is detachably mounted on the back plate body 1, so that the flexibility of using the back plate body 1 is improved.

A support assembly system for a display apparatus 1000 according to an embodiment of the present application includes the first support assembly 100 as described above, and a second support assembly 300 used together with the first support assembly 100. The support assembly system may be used in situations where a double-sided display is required, for example, as shown in FIGS. 4 to 5, when a cashier checks out, one side of the display apparatus is required to display for the cashier, and the other side of the display apparatus is required to display for a payer, which is only taken as an example. There are, of course, other double-sided application scenes. In this case, the first support assembly 100 is adapted to being used together with the second support assembly 300, the first support assembly 100 and the second support assembly 300 are disposed back-to-back, and the second connecting structure 32 of the first support assembly 100 is configured to be detachably connected to the second support assembly 300. Here, the second support assembly 300 may be another support assembly with the same structure as the first support assembly 100. Alternatively, the second support assembly 300 may be another support assembly with a different structure from the first support assembly 100, for example, the second support assembly 300 may not include the sliding bracket 3, or the second support assembly 300 may not include the sliding slot structure 10, or the second support assembly 300 may neither include the sliding bracket 3 nor include the sliding slot structure 10. The second support assembly 300 may be a rear plate of the display apparatus 1000 or a support plate detachably connected to the display apparatus 1000.

In the support assembly system for a display apparatus 1000 according to the embodiment of the present application, the two display apparatus 1000 may be disposed back-to-back, which is convenient for users to use the display apparatus 1000 on both sides. The second connecting structure 32 of the first support assembly 100 is configured to be detachably connected to the second support assembly 300, so that the first support assembly 100 and the second support assembly 300 may be conveniently combined together for use, and may be conveniently detached from each other after use, thereby facilitating storage and transportation.

In some embodiments of the present application, as shown in FIG. 1, the second support assembly 300 is identical to the first support assembly 100 in structure. Therefore, the second support assembly 300 and the first support assembly 100 may be conveniently matched, and the double-sided display of the display apparatus 1000 may be realized. For example, two different embodiments in use will be given below.

First Embodiment

The first support assembly 100 is the first support assembly 100 as described above, when the first support assembly 100 and the second support assembly 300 are used together, the first support assembly 100 and the second support assembly 300 are disposed back-to-back, the second connecting structure 32 of the first support assembly 100 is connected to the second support assembly 300 and is configured to slide along the second sliding slot 12 of the second support assembly 300, and the second connecting structure 32 of the second support assembly 300 is connected to the first support assembly 100 and is configured to slide along the second sliding slot 12 of the first support assembly 100.

Therefore, the angle between the first support assembly 100 and the holder and the angle between the second support assembly 300 and the holder may be adjusted, respectively, so that it may be realized that the angles of the first support assembly 100 and the second support assembly 300 are freely and independently adjusted in a wide range. FIG. 4 shows an example in which the first support assembly 100 and the second support assembly 300 are placed at the same angle, and FIG. 5 shows an example in which the first support assembly 100 and the second support assembly 300 are placed at different angles.

Second Embodiment

The first support assembly 100 is the first support assembly 100 as described above, when the first support assembly 100 and the second support assembly 300 are used together, the sliding bracket 3 on the first support assembly 100 is retained, the sliding bracket 3 on the second support assembly 300 is detached, and the second connecting structure 32 on the first support assembly 100 is connected to the second support assembly 300 and is configured to slide along the sliding slot structure 10 on the second support assembly 300. Alternatively, the sliding bracket 3 of the first support assembly 100 is detached, the sliding bracket 3 of the second support assembly 300 is retained, and the second connecting structure 32 of the second support assembly 300 is connected to the first support assembly 100 and is configured to slide along the sliding slot structure 10 of the first support assembly 100.

The above two embodiments may realize the adjustment of the angle between the first support assembly 100 and the holder and the angle between the second support assembly 300 and the holder, so that it may be realized that the angles of the first support assembly 100 and the second support assembly 300 are freely and independently adjusted in a wide range. FIG. 4 shows an example in which the first support assembly 100 and the second support assembly 300 are placed at the same angle, and FIG. 5 shows an example in which the first support assembly 100 and the second support assembly 300 are placed at different angles.

A display apparatus 1000 according to an embodiment of the present application includes the first support assembly 100 as described above and a display assembly 200, and the back plate body 1 is a rear plate of the display apparatus 1000 and is provided at a non-display side of the display assembly 200.

In the display apparatus 1000 according to the embodiment of the present application, through mounting the sliding bracket 3 on the back plate body 1 and sliding the first connecting structure 31 along the sliding slot structure 10, when the first support assembly 100 is adapted to being used separately, a relative position between the sliding bracket 3 and the back plate body 1 may be adjusted, and thereby the angle between the back plate body 1 and the holder may be adjusted, since the back plate body 1 is the rear plate of the display apparatus 1000 or the support plate detachably connected to the display apparatus 1000, the sliding bracket 3 may slide relative to the back plate body 1 to adjust the angle between the display apparatus 1000 and the holder, and thus the requirements of users on different angles for placing the display apparatus 1000 may be met; when the first support assembly 100 is adapted to being used together with the second support assembly 300, the first support assembly 100 and the second support assembly 300 may be disposed back-to-back, which is convenient for users to use the display apparatus 1000 on both sides. The second connecting structure 32 of the first support assembly 100 is configured to be detachably connected to the second support assembly 300, so that the first support assembly 100 and the second support assembly 300 may be conveniently combined together for use, and may be conveniently detached from each other after use, thereby facilitating storage and transportation.

A dual-sided display apparatus according to an embodiment of the present application includes the support assembly system as described above and two display assemblies 200, and the first support assembly 100 and the second support assembly 300 are used to support the two display assemblies 200, respectively.

In the double-sided display apparatus according to the embodiment of the present application, through mounting the sliding bracket 3 on the back plate body 1, and sliding the first connecting structure 31 along the sliding slot structure 10, when the first support assembly 100 is adapted to being used separately, a relative position between the sliding bracket 3 and the back plate body 1 may be adjusted, and thereby the angle between the back plate body 1 and the holder may be adjusted, since the back plate body 1 is the rear plate of the display apparatus 1000 or the support plate detachably connected to the display apparatus 1000, the sliding bracket 3 may slide relative to the back plate body 1 to adjust the angle between the display apparatus 1000 and the holder, and thus the requirements of users on different angles for placing the display apparatus 1000 may be met; when the first support assembly 100 is adapted to being used together with the second support assembly 300, the first support assembly 100 and the second support assembly 300 may be disposed back-to-back, which is convenient for users to use the display apparatus 1000 on both sides. The second connecting structure 32 of the first support assembly 100 is configured to be detachably connected to the second support assembly 300, so that the first support assembly 100 and the second support assembly 300 may be conveniently combined together for use, and may be conveniently detached from each other after use, thereby facilitating storage and transportation.

According to some embodiments of the present application, the back plate body 1 is a rear plate of the display apparatus 1000 or a support plate detachably connected to the display apparatus 1000, and the back plate body 1 has a first sliding slot 11 and a second sliding slot 12 which are arranged in parallel. The sliding structure 2 is arranged at the inner side of the back plate body 1 and includes a first slipping structure 21, a second slipping structure 22 and a connecting rod structure 23. The first slipping structure 21 is matched with the first sliding slot 11 to slide along the first sliding slot 11, the second slipping structure 22 is matched with the second sliding slot 12 to slide along the second sliding slot 12, and the connecting rod structure 23 is connected to the first slipping structure 21 and the second slipping structure 22 so that the first slipping structure 21 and the second slipping structure 22 may slide synchronously. The sliding bracket 3 is disposed at an outer side of the back plate body 1 and includes a first connecting structure 31 and a second connecting structure 32, the first connecting structure 31 is connected to the first slipping structure 21 to slide synchronously with the first slipping structure 21. When the two first support assemblies 100 are disposed back-to-back, the second connecting structure 32 on the sliding bracket 3 of one of the first support assemblies 100 is adapted to be detachably connected to and slide synchronously with the second slipping structure 22 of the other of the first support assemblies 100.

It should be noted that "the inner side of the back plate body 1" refers to a side of the back plate body 1 close to the display side of the display apparatus 1000 in the thickness direction of the display apparatus 100, and "the outer side of the back plate body 1" refers to a side of the back plate body 1 away from the display side of the display apparatus 1000 in the thickness direction of the display apparatus 100. In addition, "two first support assemblies 100 are disposed back-to-back" means that the outer side of the back plate body 1 of one of the two first support assemblies 100 faces the outer side of the back plate body 1 of the other of the two first support assemblies 100.

In addition, it should be noted that "the rear plate of the display apparatus 1000" refers to an own back plate of the display apparatus 1000 on the back side of the display apparatus 1000, which back plate is not detachable from the display apparatus 1000. "The support plate detachably connected to the display apparatus 1000" refers to a back plate which is detachably mounted to the back side of the display apparatus 1000, such as a protective sleeve clamped or sleeved on the back side of the display apparatus 1000.

It may be understood that, referring to FIG. 3, the first connecting structure 31 is connected to the first slipping structure 21 so that the sliding bracket 3 may be connected to the back plate body 1, and the sliding bracket 3 may support the back plate body 1, so that when the back plate body 1 is placed on the holder, a certain angle may be formed between the back plate body 1 and the holder. Here, the holder may be a conference table, a dining table, a cash register, a floor, etc., and the holder has a same meaning throughout this description. The first connecting structure 31 and the first slipping structure 21 may together slide along the first sliding slot 11, thereby the relative position between sliding bracket 3 and the back plate body 1 may be adjusted, and the angle between back plate body 1 and the holder may be adjusted. Since the back plate body 1 is the rear plate of the display apparatus 1000 or the support plate detachably connected to the display apparatus 1000, the sliding bracket 3 may slide relative to the back plate body 1 to adjust the angle between the display apparatus 1000 and the holder, and thus the requirements of users on different angles for placing the display apparatus 1000 may be met.

In addition, in some cases, a double-sided display is required. Referring to FIGS. 4 to 5, for example, when a cashier checks out, one side of the display apparatus is required to display for the cashier, and the other side of the display apparatus is required to display for a payer, which is only taken as an example. There are, of course, other double-sided application scenes. In this case, two display apparatus 1000 may be disposed back-to-back, that is, the back plate bodies 1 of the two first support assemblies 100 may be disposed back-to-back, and the second connecting structure 32 on the sliding bracket 3 connected to one of the back plate bodies 1 may be detachably connected to the second slipping structure 22 of the sliding structure 2 arranged on the other of the back plate bodies 1, so that the two display apparatus 1000 may be disposed back-to-back, which is convenient for the users to use the display apparatus 1000 on both sides. The second connecting structure 32 of the sliding bracket 3 of one of the two first support assemblies 100 is adapted to being detachably connected to the second slipping structure 22 of the other of the two first support assemblies 100, so that the two first support assemblies 100 may be conveniently combined together for use, and may be conveniently detached from each other after use, thereby facilitating storage and transportation.

The sliding structure 2 includes a first slipping structure 21, a second slipping structure 22 and a connecting rod structure 23, the connecting rod structure 23 connects the first slipping structure 21 and the second slipping structure 22 together, thereby allowing the first slipping structure 21 and the second slipping structure 22 to slide synchronously, and allowing the first connecting structure 31 on one of the sliding brackets 3 and the second connecting structure 32 on the other of the sliding brackets 3 to slide synchronously, thereby enabling the two sliding brackets 3 provided on the two back plate bodies 1 to slide synchronously, and the two sliding brackets 3 may be at different positions relative to the respective back plate bodies 1, thereby the angles between display apparatus 1000 and the holder may be adjusted, respectively, and it may be realized that the angles of the two display apparatus 1000 are freely and independently adjusted in a wide range. FIG. 4 shows an example in which the two display apparatus 1000 are placed at the same angle, and FIG. 5 shows an example in which the two display apparatus 1000 are placed at different angles. The first support assembly 100 for a display apparatus 1000 according to the present application may allow two display apparatus 100 to be placed at a same angle and at different angles.

The sliding structure 2 is arranged at the inner side of the back plate body 1, and the sliding bracket 3 is arranged at the outer side of the back plate body 1, so that the sliding structure 2 and the sliding bracket 3 may be arranged so that the interference between the sliding structure 2 and the sliding bracket 3 may be avoided, and the structure of the first support assembly 100 as a whole is compact, and thus, a volume of the structure of the first support assembly 100 is reduced.

In the first support assembly 100 for a display apparatus 1000 according to the embodiment of the present application, the first slipping structure 21 of the sliding structure 2 is connected to the first connecting structure 31 of one sliding bracket 3, so as to connect one sliding bracket 3 to the back plate body 1, the first connecting structure 31 and the first slipping structure 21 may slide together in the first sliding slot 11, so that the relative position of the sliding bracket 3 relative to the back plate body 1 may be changed, thereby adjusting the placement angle of the display apparatus 1000. The second connecting structure 32 of the sliding bracket 3 of one of the first support assemblies 100 is detachably connected to the second slipping structure 22 of the other of the first support assemblies 100, so that two display apparatus 1000 may be disposed back-to-back, which is convenient for the users to use the display apparatus 1000 on both sides. The connecting rod structure 23 connects the first slipping structure 21 and the second slipping structure 22 together, thereby allowing the first slipping structure 21 and the second slipping structure 22 to slide synchronously, and allowing the first connecting structure 31 on one of the sliding brackets 3 and the second connecting structure 32 on the other of the sliding brackets 3 to slide synchronously, thereby enabling the two sliding brackets 3 provided on the two back plate bodies 1 to slide synchronously, and the two sliding brackets 3 may be at different positions relative to the respective back plate bodies 1, thereby the angles between display apparatus 1000 and the holder may be adjusted, respectively, and it may be realized that the angles of the two display apparatus 1000 are freely and independently adjusted in a wide range. The display apparatus 1000 may better meet the user requirement when the application scenes of the display apparatus 1000 are switched, and the cost generated by multiple developments for different application scenes is reduced.

In some embodiments of the present application, as shown in FIGS. 6 to 7, the second sliding structure 22 and the second connecting structure 32 may magnetically attract each other, such that the second connecting structure 32 on one first support assembly 100 is adapted to be magnetically connected to the second sliding structure 22 on the other first support assembly 100. Therefore, two first support assemblies 100 may be connected together back-to-back. In addition, the magnetic connection may facilitate the connection between the second slipping structure 22 and the second connecting structure 32, thereby improving an operation convenience, and facilitating a separation of the second slipping structure 22 and the second connecting structure 32 from each other.

It should be noted that, in order to realize that the second slipping structure 22 and the second connecting structure 32 are magnetically attractable, both the second slipping structure 22 and the second connecting structure 32 may be provided as a magnet, or one of them may alternatively be provided as a magnet, and the other one is provided as iron, etc., which is not limited herein. In addition, in the embodiments of the present application, besides the above implementation, the fit manner of the second slipping structure 22 and the second connecting structure 32 is not limited to the magnetic connection, for example, may alternatively be a thread fit, a snap fit, etc., or may alternatively be a combination of a strong fit and a weak fit, such as the thread fit plus the magnetic connection.

Referring to FIG. 7, according to some embodiments of the present application, the second slipping structure 22 is sunk into the second sliding slot 12, the sliding bracket 3 includes a bracket body 33, and at least a part of the second connecting structure 32 protrudes to the outer side of the bracket body 33 and is adapted to be inserted into the second sliding slot 12 in the other first support assembly 100. Therefore, when the second connecting structure 32 is connected to the second slipping structure 22 of the other first support assembly 100, the second connecting structure 32 may be inserted into the second sliding slot 12, so that the connection between the first support assembly 100 where the second connecting structure 32 is located and the other first support assembly 100 is more reliable. Further, when the second connecting structure 32 and the second slipping structure 22 connected to the second connecting structure 32 slide together, the second sliding slot 12 may have a limiting effect on both the second connecting structure 32 and the second slipping structure 22, so that the sliding is more reliable and smoother.

Alternatively, according to some other embodiments of the present application, the sliding bracket 3 includes a bracket body 33, the bracket body 33 has an insertion hole therein, the second connecting structure 32 is sunk into the insertion hole, and a part of the second slipping structure 22 protrudes out of the second sliding slot 12 and is adapted to be inserted into the insertion hole of the other first support assembly 100. Therefore, when the second slipping structure 22 is connected to the second connecting structure 32, the second slipping structure 22 may be inserted into the insertion hole in the other first support assembly 100, so that the connection between the first support assembly 100 where the second slipping structure 22 is located and the other first support assembly 100 is more reliable.

According to some embodiments of the present application, referring to FIGS. 1 and 3, the sliding bracket 3 may include a bracket body 33, the bracket body 33 may be cylindrical, the first connecting structure 31 and the second connecting structure 32 are arranged at a circumferential wall of the bracket body 33 and spaced apart in a circumferential direction of the bracket body 33, the cylindrical bracket body 33 allows the first connecting structure 31 and the second connecting structure 32 to be oriented in different directions, so that the first connecting structure 31 and the second connecting structure 32 may be connected to two different first support assemblies 100, respectively. Therefore, two different display apparatus 1000 may be connected together back-to-back, to realize the double-sided display. Moreover, the cylindrical bracket body 33 allows the first connecting structure 31 to be closer to the first slipping structure 21 connected to the first connecting structure 31, and allows the second connecting structure 32 to be closer to the second slipping structure 22 connected to the second connecting structure 32, thereby the first connecting structure 31 and the second connecting structure 32 are arranged at the circumferential wall of the bracket body 33 and spaced apart from each other, which is convenient for the second connecting structure 32 to be connected to the second slipping structure 22 of the other first support assembly 100 while the first connecting structure 31 is connected to the first slipping structure 21 of one first support assembly 100. Alternatively, in other embodiments, the bracket body 33 may have other shapes, such as a sphere, a polygon, etc., which is not limited here.

As shown in FIGS. 1 and 3, in some embodiments of the present application, the sliding bracket 3 is rotatable around the first slipping structure 21, so that the use of the sliding bracket 3 may be more flexible, the back plate body 1 may be supported at different positions of the sliding bracket 3, In some examples, when the sliding bracket 3 includes a bracket body 33, the bracket body 33 is cylindrical. When the display apparatus 1000 is required to display on a single side, as shown in FIG. 3, the axis of the bracket body 33 forms an angle with respect to the display surface of the display apparatus 1000, namely forms an angle with respect to the holder, so that the support for the bracket body 33 is more stable. When the display apparatus 1000 is required to display on both sides, as shown in FIG. 1, the sliding bracket 3 is rotated around the first slipping structure 21 until the axis of the bracket body 33 is parallel to the display surface of the display apparatus 1000, that is, parallel to the holder, thereby the cylindrical bracket body 33 allows the first connecting structure 31 and the second connecting structure 32 to be oriented in different directions, so that the first connecting structure 31 and the second connecting structure 32 may be connected to two different first support assemblies 100, respectively, thereby connecting two different display apparatus 1000 together to realize the double-sided display. Further, the cylindrical bracket body 33 allows the first connecting structure 31 to be closer to the first slipping structure 21 connected to the first connecting structure 31, and allows the second connecting structure 32 to be closer to the second slipping structure 22 connected to the second connecting structure 32, thereby the first connecting structure 31 and the second connecting structure 32 are arranged at the circumferential wall of the bracket body 33 and spaced apart from each other, which is convenient for the second connecting structure 32 to be connected to the second slipping structure 22 of the other first support assembly 100 while the first connecting structure 31 is connected to the first slipping structure 21 of one first support assembly 100.

According to some embodiments of the present application, referring to FIG. 2, the sliding bracket 3 includes a bracket body 33, the bracket body 33 has a through hole 331 therein, the first connecting structure 31 is connected to the first slipping structure 21 through a rotating shaft 332, and the rotating shaft 332 passes through the through hole 331, so that the sliding bracket 3 may rotate around the rotating shaft 332. For example, as shown in FIG. 7, the first connecting structure 31 and the first slipping structure 21 may be fixedly connected together through the rotating shaft 332, and three of them cannot rotate relatively, so that the connection between the first connecting structure 31 and the first slipping structure 21 is reliable and stable, the sliding bracket 3 may be conveniently rotated around the first slipping structure 21. For another example, as shown in FIG. 8, the first connecting structure 31 and the bracket body 33 may be a one-piece member, in this case, the first slipping structure 21 is fixedly connected to the rotating shaft 332, the through hole 331 is formed in the first connecting structure 31 and the bracket body 33, and the rotating shaft 332 is rotatably disposed in the through hole 331 and rotatably connected to the first connecting structure 31.

As shown in FIGS. 8 to 9, in some embodiments of the present application, a first sliding damping structure 4 may be disposed between the back plate body 1 and the sliding structure 2, thereby a damping force may be added between the back plate body 1 and the sliding structure 2, so that the sliding structure 2 may stay at any position of the first sliding slot 11 and the second sliding slot 12 of the back plate body 1, and may not slide to the bottom of the first sliding slot 11 and the second sliding slot 12 due to the gravity of the sliding structure 2, thereby the sliding bracket 3 connected to the sliding structure 2 may be facilitated to be located at different positions of the back plate body 1, thereby facilitating realizing the stability of the display apparatus 1000 placed at different angles, including not only a single display apparatus 1000 placed at different angles, but also each of two display apparatus 1000 back-to-back placed at different angles.

According to some embodiments of the present application, referring to FIG. 8, at least one of a fit position between the first slipping structure 21 and the first sliding slot 11, a fit position between the second slipping structure 22 and the second sliding slot 12, and a fit position between the connecting rod structure 23 and an inner side wall of the back plate body 1 is provided with a first sliding damping structure 4. It may be understood that the first sliding damping structure 4 may be disposed at the fit position between the first slipping structure 21 and the first sliding slot 11, so that a damping force may be added between the first slipping structure 21 and the first sliding slot 11; alternatively, a first sliding damping structure 4 may be disposed at the fit position between the second slipping structure 22 and the second sliding slot 12, so that a damping force may be added between the second slipping structure 22 and the second sliding slot 12; and alternatively, a first sliding damping structure 4 may be disposed at the fit position between the connecting rod structure 23 and the inner side wall of the back plate body 1, so that a damping force may be added between the connecting rod structure 23 and the inner side wall of the back plate body 1.

For example, the first sliding damping structure 4 may be disposed at the fit position between the first slipping structure 21 and the first sliding slot 11, and the fit position between the second slipping structure 22 and the second sliding slot 12; alternatively, the first sliding damping structure 4 may be disposed at the fit position between the second slipping structure 22 and the second sliding slot 12, and the fit position between the connecting rod structure 23 and the inner side wall of the back plate body 1; and alternatively, the first sliding damping structure 4 may be disposed at the fit position between the first slipping structure 21 and the first sliding slot 11, and the fit position between the connecting rod structure 23 and the inner side wall of the back plate body 1. The first sliding damping structure 4 may be arranged at all of the fit position between the first slipping structure 21 and the first sliding slot 11, the fit position between the second slipping structure 22 and the second sliding slot 12, and the fit position between the connecting rod structure 23 and the inner side of the back plate body 1.

The damping force allows the sliding structure 2 to stay at any position of the first sliding slot 11 and the second sliding slot 12 of the back plate body 1, and not slide to the bottom of the first sliding slot 11 and the second sliding slot 12 due to the gravity of the sliding structure 2, thereby the sliding bracket 3 connected to the sliding structure 2 may be facilitated to be located at different positions of the back plate body 1, thereby facilitating realizing the display apparatus 1000 placed at different angles, including not only a single display apparatus 1000 placed at different angles, but also each of two display apparatus 1000 back-to-back placed at different angles.

In some specific examples, referring to FIG. 8, the first sliding slot 11 and the second sliding slot 12 may penetrate through the back plate body 1, and in this case, any position in the penetrating direction of the first sliding slot 11 may be provided with the first sliding damping structure 4, for example, both the inner side and the outer side of the first sliding slot 11 may be provided with the first sliding damping structure 4. Similarly, any position in the penetrating direction of the second sliding slot 12 may be provided with the first sliding damping structure 4, for example, both the inner side and the outer side of the second sliding slot 12 may also be provided with the first sliding damping structure 4. Therefore, the damping force through which the sliding structure 2 drives the sliding bracket 3 to slide relative to the back plate body 1 may be increased, and the problem may be prevented from occurring that the sliding bracket 3 cannot stay at any position of the first sliding slot 11 or the second sliding slot 12 due to insufficient damping force so that the placement angle of the display apparatus 1000 cannot be adjusted.

Alternatively, the display apparatus 1000 is large, the first support assembly 100 is also large, a distance between the first sliding slot 11 and the second sliding slot 12 may set to be great. In this case, the connecting rod structure 23 is longer, therefore a plurality of first sliding damping structure 4 may be disposed between the connecting rod structure 23 and the inner side wall of the back plate body 1 and spaced apart from each other, thereby further increasing an effect of friction force, increasing the damping force between the connecting rod structure 23 and the inner side of the back plate body 1, and strengthening the limiting effect in the sliding direction. The number of the first sliding damping structures 4 between the connecting rod structure 23 and the inner side of the back plate body 1 may be set according to the requirement, and is not limited. In addition, as shown in FIG. 8, in some embodiments, a boss for mounting the first sliding damping structure 4 may be arranged at the inner side wall of the back plate body 1, which is not described in detail herein. In addition, it should be noted that the connecting rod structure 23 may be a single rod, or may be formed by splicing a plurality of sub-rods, which is not limited herein.

As shown in FIG. 8, in some embodiments of the present application, a second sliding damping structure 5 is disposed between the through hole 331 and the rotating shaft 332, thereby a damping force may be added between the sliding bracket 3 and the first sliding slot 11, so that the sliding bracket 3 may stay at any position of the first sliding slot 11. Further, a damping force may be added between the through hole 331 and the rotational shaft 332, so that the sliding bracket 3 may stop steadily after rotating by any angle around the rotating shaft 332. Therefore, it may be convenient for the sliding bracket 3 to rotate by any angle around the rotating shaft 332, thereby the use of the sliding bracket 3 is more flexible, and the support effect for the sliding bracket 3 is better.

In some embodiments of the present application, the first slipping structure 21 and the first connecting structure 31 may be detachably and fixedly connected together, or may be non-detachably and fixedly connected together, and the connection manner includes, but is not limited to, an interference fit, a non-detachable snap fit, a thread fit, or the like. The present application is not limited thereto. Alternatively, the first slipping structure 21 and the first connecting structure 31 may be rotatably connected together, so that when the sliding bracket 3 does not slide along the first sliding slot 11, an included angle between a central axis of the sliding bracket 3 and the display apparatus 1000 may be adjusted, thereby adjusting an inclination angle of the display apparatus 1000.

Referring to FIGS. 1 and 3, in some embodiments of the present application, the back plate body 1 has a scale mark structure 6 on an outer surface thereof, the scale mark structure 6 is disposed closer to the second sliding slot 12 than the first sliding slot 11, i.e., a distance between the scale mark structure 6 and the first sliding slot 11 is greater than a distance between the scale mark structure 6 and the second sliding slot 12, and the scale mark structure 6 is used for marking a height position in an extending direction of the second sliding slot 12. Therefore, the scale mark structure 6 may help the user to confirm the support angle of sliding bracket 3, and moreover, when combining two first support assemblies 100, the scale mark structure 6 may realize the assembly accuracy when the two first support assemblies 100 abut against each other back-to-back.

A first support assembly 100 according to an embodiment of the present application will be described in detail below with reference to FIGS. 1 to 9. It should be understood that the following description is illustrative only and is not intended as a specific limitation on the present application.

The first support assembly 100 includes a back plate body 1, a sliding structure 2 and a sliding bracket 3, and a first sliding slot 11 and a second sliding slot 12 arranged in parallel are arranged in the back plate body 1. The sliding structure 2 is arranged at the inner side of the back plate body 1 and includes a first slipping structure 21, a second slipping structure 22 and a connecting rod structure 23. The first slipping structure 21 is matched with the first sliding slot 11 to slide along the first sliding slot 11, the second slipping structure 22 is matched with the second sliding slot 12 to slide along the second sliding slot 12, and the connecting rod structure 23 is connected to the first slipping structure 21 and the second slipping structure 22 so that the first slipping structure 21 and the second slipping structure 22 may slide synchronously. The sliding bracket 3 is disposed at an outer side of the back plate body 1 and includes a first connecting structure 31 and a second connecting structure 32, the first connecting structure 31 is connected to the first slipping structure 21 to slide synchronously with the first slipping structure 21. When the two first support assemblies 100 are disposed back-to-back, the second connecting structure 32 on the sliding bracket 3 of one of the first support assemblies 100 is adapted to be detachably connected to and slide synchronously with the second slipping structure 22 of the other of the first support assemblies 100.

The second sliding structure 22 and the second connecting structure 32 may magnetically attract each other, such that the second connecting structure 32 on one first support assembly 100 is adapted to be magnetically connected to the second sliding structure 22 on the other first support assembly 100. Therefore, two support assemblies 100 may be connected together back-to-back. In addition, the magnetic connection may facilitate the connection between the second slipping structure 22 and the second connecting structure 32, thereby improving an operation convenience, and facilitating a separation of the second slipping structure 22 and the second connecting structure 32 from each other.

Here, both the second slipping structure 22 and the second connecting structure 32 may be of a magnet structure, and a magnetic pole at the outward side of the second slipping structure 22 is opposite to the magnetic pole at the outward side of the second connecting structure 32, and the two magnetic poles attract each other. The second connecting structure 32 is a structure protruding from the sliding bracket 3. When performing a magnetic fit with the second slipping structure 22 of the other first support assembly 100, the second connecting structure 32 is firstly clamped into the second sliding slot 12 of the other first support assembly 100, and the second connecting structure 32 and the second slipping structure 22 mutually attract so that a connection fit is realized. Similarly, the other pair of second slipping structure 22 and the second connecting structure 32 mutually attract so that a connection fit is realized. The magnet having a protruding structure is firstly clamped into the second sliding slot 12, which may play a function of prepositioning and restriction, so that the magnetic fit may be accurate and reliable.

The first slipping structure 21 and the first connecting structure 31 may be fixedly connected, and the connection manner includes, but is not limited to, an interference fit, a non-detachable snap fit, a thread fit, or the like.

The sliding bracket 3 may be rotated by two angles, 0° and 90°, relative to the first slipping structure 21, and in some specific examples, there may be two and only two working positions for such two angles. When the display apparatus 1000 is used to be supported on a single side for displaying, the sliding bracket 3 rotates to a first working position for 0°, as shown in FIG. 3, the display apparatus 1000 is supported by a bottom plane of the back plate body 1, a section of the sliding bracket 3 and a plane of the holder, and the inclination angle may be adjusted by the sliding bracket 3. When the sliding bracket 3 slides, the first slipping structure 21 fixedly connected to the sliding bracket 3 is driven to slide in the first sliding slot 11, since the connecting rod structure 23 is connected to the first slipping structure 21 and the second slipping structure 22, the second slipping structure 22 is driven to synchronously slide in the second sliding slot 12, and the inclination amplitude and the position of the sliding bracket 3 may be determined through the scale mark structure 6. When the display apparatus 1000 displays on both sides, the sliding brackets 3 may be rotated to a second working position for 90°, as shown in FIG. 1, and the two sliding brackets 3 may be slid to a certain scale of the scale mark structure 6 to abut against each other back-to-back.

Through adjusting the positions of the two sliding brackets 3 in the first sliding slot 11 and the second sliding slot 12, respectively, the support of two first support assemblies 100 at different inclination angles may be realized. When the scales where the two sliding brackets 3 are located in the first sliding slot 11 and the second sliding slot 12 are the same, the two first support assemblies 100 are arranged equally at opposite sides, that is, the inclination angles at the two sides are equal. When the scales of the two sliding brackets 3 in the first sliding slot 11 and the second sliding slot 12 are different from each other, it may be realized that the two first support assemblies 100 are supported at different inclination angles, respectively, such an application manner is more adapted to application scenes with different users in the display on two sides. For example, one side of a cash register displays for a cashier and the other side of the cash register displays for a customer, and the inclination angles required at the two sides are different when the cash cashier and the customer have different heights. The first support assembly 100 may be fixed through, but not limited to, being supported on a table, or may be fixed at a certain position indirectly through adding an adapter to the sliding bracket 3.

The first sliding damping structure 4 may be arranged between the back plate body 1 and the sliding structure 2, since the sliding structure 2 and the sliding bracket 3 slide synchronously, when the sliding bracket 3 slides at any position, a resistance may be greater than the gravity of the display apparatus 1000, so that the display apparatus 1000 will not topple over. For example, the first sliding damping structure 4 may be disposed between the first slipping structure 21 and the first sliding slot 11, a second sliding damping structure 5 may be disposed between the first slipping structure 21 and the through hole 331 of the first sliding bracket 3, the first slipping structure 21 and the first connecting structure 31 are fixedly connected together, and a locking force is a compressing force along a direction perpendicular to the first sliding damping structure and the second sliding damping structure. Before assembling, the second sliding damping structure 5 is disposed at an end of the through hole 331 of the sliding bracket 3 close to the back plate body 1 in advance, the first sliding damping structure 4 is sleeved at an outer side of the first slipping structure 21. Due to the locking force, the first sliding damping structure 4 and the inner side surface of the back plate body 1, and the second sliding damping structure 5 and the outer surface of the back plate body 1 are all in a compression state, the first sliding damping structure 4 and the second sliding damping structure 5 of the elastic material are in a state of compression and deformation, and a friction force is generated between the elastic material and the rigid back plate body 1, thereby generating a damping effect on the connecting rod structure sliding down in the slide slot.

Similarly, the first sliding damping structures 4 on the other side is arranged at the inner side and the outer side of the second sliding slot 12, respectively. The second slipping structure 22 is made of a magnetic material, the inner side of the second slipping structure 22 may be provided with an internal thread matched with the connecting rod structure 23 and a groove for assembling the first sliding damping structure 4. In addition, since a certain span exists between the first sliding slot 11 and second sliding slot 12, that is, the connecting rod structure 23 is long, when the damping is not enough, the first sliding damping structures 4 may be increased between the connecting rod structure 23 and the inner side of the back plate body 1, for increasing the effect of friction force and strengthening the limiting effect in the sliding direction. The number of the first sliding damping structures 4 may be set according to the requirement, and is not limited.

In the above, it is described only one implementation manner that the connecting rod structure 23 drives the first slipping structure 21 and the second slipping structure 22 to synchronously slide in the first sliding slot 11 and the second sliding slot 12, respectively, and a damping effect exists. In addition, other techniques known in the art may alternatively be used to achieve the damping effect. It should be considered to be within the protection scope of the present application as long as the essential functions of the present application, such as the structure scheme as a whole and the mutual matching and free adjustment of the two display apparatus 1000, are utilized. Besides the above embodiments, the fit manner between the second slipping structure 22 and the second connecting structure 32 is not limited to the magnetic fit, and may alternatively be a thread fit, a snap fit, etc., or may alternatively be a combination of a strong fit and a weak fit, such as the thread fit plus the magnetic connection.

In the description of the present application, it should be understood that the terms "central," "longitudinal," "transverse," "length," "width," "thickness," "up," "down," "front," "rear," "left," "right," "vertical," "horizontal," "top," "bottom," "inner," "outer," "clockwise," "counterclockwise," "axial," "radial," "circumferential," and the like are used in the orientations and positional relationships indicated in the drawings for convenience in describing the present application and to simplify the description only, but are not intended to indicate or imply that the device or element must have a particular orientation, be constructed and operated in a particular orientation, and are not to be construed as limiting the present application. Furthermore, a feature defined by the term "first" or "second" may explicitly or implicitly include one or more features. In the description of the present application, the term "a plurality of" means two or more, unless specifically limited otherwise.

In the description of the present application, it should be noted that unless specifically specified and limited otherwise, the terms "mounted," "coupled" and "connected" in the description of the present application should be construed broadly and for example may be fixedly connected, detachably connected or integrally connected; may be mechanically or electrically connected; may be directly connected or indirectly connected through intervening media, or may be an internal connection between two elements. The specific meanings of the above terms in the present application may be understood in a specific case to one of ordinary skill in the art.

In the description of this specification, the description with reference to the term "one embodiment", "some embodiments", "an illustrative embodiment", "an example", "a specific example", "some examples", or the like means that a specific feature, structure, material, or characteristic described in connection with the embodiment or example is included in at least one embodiment or example of the present application. In this specification, schematic representations of the above terms do not necessarily refer to the same embodiment or example. Furthermore, the specific feature, structure, material, or characteristic described may be combined in a suitable manner in any one or more embodiments or examples.

While the embodiment of the present application has been shown and described, it will be understood by one of ordinary skill in the art that numerous changes, modifications, substitutions and variations may be made to the embodiment without departing from the principle and spirit of the present application, the scope of which is defined by the claims and their equivalents.

What is claimed is:

1. A first support assembly for a display apparatus, comprising:
    a back plate body, wherein the back plate body is a rear plate of the display apparatus or a support plate detachably connected to the display apparatus, and the back plate body is provided with a sliding slot structure; and
    a sliding bracket, wherein the sliding bracket is mounted to the back plate body and comprises a bracket body, a first connecting structure and a second connecting structure, the first connecting structure and the second connecting structure are arranged at the bracket body and spaced apart from each other, the bracket body is at an outer side of the back plate body, and the first connecting structure is configured to be slidable along the sliding slot structure,
    wherein the first support assembly is adapted to being used separately, and the back plate body and the sliding bracket are matched to support the display apparatus; or
    the first support assembly is adapted to being used together with a second support assembly, the first support assembly and the second support assembly are disposed back-to-back, and the second connecting structure in the first support assembly is configured to be detachably connected to the second support assembly,
    wherein the first support assembly further comprises a sliding structure, wherein the sliding structure is configured to be arrested at an inner side of the back plate body, and is connected to the first connecting structure through a penetrating structure passing through the sliding slot structure.

2. The first support assembly for a display apparatus according to claim 1, wherein the sliding bracket is rotatably engaged with the back plate body through the first connecting structure.

3. The first support assembly for a display apparatus according to claim 2, wherein the bracket body is cylindrical, and both the first connecting structure and the second connecting structure are at a circumferential wall of the bracket body and spaced apart from each other in a circumferential direction of the bracket body;
    wherein a rotation axis of the sliding bracket intersects a central axis of the bracket body.

4. The first support assembly for a display apparatus according to claim 1, further comprising a first sliding damping structure between the back plate body and the sliding structure.

5. The first support assembly for a display apparatus according to claim 1, wherein the sliding slot structure comprises a plurality of sliding slots.

6. The first support assembly for a display apparatus according to claim 5, wherein at least two of the plurality of sliding slots cross each other.

7. The first support assembly for a display apparatus according to claim 5, wherein the plurality of sliding slots comprises a first sliding slot and a second sliding slot parallel to each other, and the first connecting structure is configured to be slidable along the first sliding slot.

8. The first support assembly for a display apparatus according to claim 7, wherein the sliding structure comprises a first slipping structure, a second slipping structure and a connecting rod structure, the first slipping structure is matched with the first sliding slot to be slidable along the first sliding slot, the second slipping structure is matched with the second sliding slot to be slidable along the second sliding slot, the connecting rod structure connects the first slipping structure and the second slipping structure together, such that the first slipping structure and the second slipping structure are slidable synchronously, and the first connecting structure is connected to the first slipping structure through a penetrating structure passing through the first sliding slot.

9. The first support assembly for a display apparatus according to claim 8, further comprising a first sliding damping structure between the back plate body and at least one of the first slipping structure, the second slipping structure and the connecting rod structure.

10. The first support assembly for a display apparatus according to claim 8, wherein a material of the second connecting structure and a material of the second slipping structure are adapted to magnetically attracting each other.

11. The first support assembly for a display apparatus according to claim 1, wherein the second connecting structure is a magnetic connector structure.

12. The first support assembly for a display apparatus according to claim 1, wherein an outer surface of the back plate body is a curved surface protruding toward the outer side of the back plate body.

13. The first support assembly for a display apparatus according to claim 1, wherein the sliding bracket is detachably mounted to the back plate body.

14. A support assembly system for a display apparatus, comprising the first support assembly according to claim 1, and a second support assembly for being used together with the first support assembly.

15. The support assembly system for a display apparatus according to claim 14, wherein the second support assembly is identical to the first support assembly in structure.

16. The support assembly system for a display apparatus according to claim 15, wherein the sliding slot structure comprises a plurality of sliding slots, the plurality of sliding slots comprises a first sliding slot and a second sliding slot parallel to each other, and the first connecting structure is configured to be slidable along the first sliding slot, the first support assembly is configured to be used together with the second support assembly, the first support assembly and the second support assembly are disposed back-to-back, the second connecting structure of the first support assembly is connected to the second support assembly and configured to be slidable along the second sliding slot of the second support assembly, and the second connecting structure of the second support assembly is connected to the first support assembly and configured to be slidable along the second sliding slot of the first support assembly.

17. The support assembly system for a display apparatus according to claim 15, wherein the first support assembly is configured to be used together with the second support assembly, the sliding bracket of the first support assembly is retained, the sliding bracket of the second support assembly is detached, and the second connecting structure of the first support assembly is connected to the second support assembly and configured to be slidable along the sliding slot structure of the second support assembly; or the sliding bracket of the first support assembly is detached, the sliding bracket of the second support assembly is retained, and the second connecting structure of the second support assembly is connected to the first support assembly and configured to be slidable along the sliding slot structure of the first support assembly.

18. A display apparatus, comprising: a display assembly; and the first support assembly according to claim 1, wherein the back plate body is the rear plate for the display apparatus and at a non-display side of the display assembly.

19. A dual-sided display apparatus, comprising: two display assemblies; and the support assembly system according to claim 14, wherein the first support assembly and the second support assembly are configured to support the two display assemblies, respectively.

* * * * *